June 28, 1966 S. SCHALKOWSKY 3,258,598
SPACE VEHICLE SELF-ORIENTING BY RADIATION PRESSURE WITH
RESPECT TO SOURCE AND INCLUDING ENERGY CONVERTER
Filed Nov. 19, 1962 2 Sheets-Sheet 1

INVENTOR.
SAMUEL SCHALKOWSKY
BY Henry W. Kaufmann
AGENT

United States Patent Office 3,258,598
Patented June 28, 1966

3,258,598
SPACE VEHICLE SELF-ORIENTING BY RADIATION PRESSURE WITH RESPECT TO SOURCE AND INCLUDING ENERGY CONVERTER
Samuel Schalkowsky, Radnor, Pa., assignor to General Electric Company, a corporation of New York
Filed Nov. 19, 1962, Ser. No. 238,352
2 Claims. (Cl. 250—203)

This invention pertains to the collection of radiant energy and its concentration upon a converter which is adapted to convert the collected energy into another form.

The natural radiant energy of the sun is, of course, either directly or indirectly the source of much of the energy used by man on earth today. Since it has, in the vicinity of the earth's surface, a density of the order of 130 watts per square foot, it has been utilized as a source of energy for various man-produced satellites. This has been done most commonly by the use of photovoltaic cells which are usually mounted on surfaces which are oriented toward the sun, as the satellite revolves around the earth, by servo devices which rotate the surfaces (commonly called "paddles" from their appearance) with respect to the satellite body, which is itself stabilized by complex and ingenious devices which consume energy or dissipate matter, or both.

The natural solar energy density ambient about the earth is insufficient for the most efficient operation of photovoltaic cells, and inadequate for operation of any conventional forms of the thermionic converter, which is a competitor of the photovoltaic cell for satellite use. It, therefore, becomes at least desirable, and possibly necessary, to employ collecting or concentrating devices to increase the density of energy incident upon the energy converter above that existing in the vicinity of the earth. Practical considerations of mass, fragility and stability under miscellaneous kinds of radiation suffice to exclude refractive devices from consideration. Reflective devices appear at the present time to be the ones most worthy of serious consideration.

It is taught in physics textbooks that electromagnetic energy incident upon a surface produces a pressure. A detailed reference upon this subject is "The Pressure of Light" by J. H. Poynting, published in 1910 by the London Society for Promoting Christian Knowledge. This fact has led many persons to suggest that the pressure of the sun's radiation may be employed to stabilize a space vehicle with respect to the sun; and it has also been suggested to use the same surface which serves as a stabilizing device to collect energy for absorption by a converter. For example, R. L. Sohn in the Journal of the American Rocket Society, May 1959, page 371 et seq., and Fry and Stearns in the same journal, December 1959, page 927 et seq., deal with the idea of stabilizing space vehicles with the space version of a sea anchor, without much concern for the geometry of the surfaces involved, Fry and Stearns being specific only to the extent of showing that they are discussing a body whose convex surface is stable toward the sun. D. H. Dickstein, in "A Solar Probe," preprint 61–179–1873 of the American Rocket Society Meeting of 13–16 June 1961, goes rather more into detail in a proposal (page 6 of reference) to use a paraboloidal mirror 8 feet in diameter to collect energy for a thermionic converter. This mirror is stated to be adequate to provide sufficient energy at 1 astronomical unit from the sun; it is further stated that when, in the intended use of the device, it approaches within 0.1 astronomical unit of the sun, "most of the reflected flux is spilled, that is, does not fall on the converter array." It is further stated (page 7 of reference) "by placing the solar collector behind the vehicle center of gravity, radiation pressure steers the collector continuously to the sun." Dickstein's illustrations (FIGS. 3, 4 or 5 of reference) indicate that the vehicle of which the reflector is to be a part is very long, so that even the thermionic converter lies well on the reflector side of the vehicle's center of gravity. If this be true, it appears that his embodiment will function. However, his statement, "by placing the solar collector behind the vehicle center of gravity, radiation pressure steers the collector continuously to the sun," while representative of the teachings of the art at that time, is correct only when restricted to the particular kind of embodiment described.

I shall show hereinafter that the torque produced by incidence of radiation upon a paraboloidal surface differs markedly according to whether the surface is absorbing or whether it is reflecting back freely into space. For a surface suitable for concentrating radiation, such as a paraboloidal or spherical mirror, the center of pressure of the incident radiation often lies farther from the reflector than does the focus of the reflector, the term "focus" being used to designate the place where energy is most concentrated even if the concentrator is of such poor optical quality that no true image is formed. In other words, if a vehicle were constructed with such a reflector and with none of its mass located farther from the reflector than the focal point of the reflector, since the center of pressure of radiation would lie closer to the sun than the center of mass of the system, it would be unstable tending to tumble so that its collector would face away from the sun or other source of radiation. I have invented a way of constructing a vehicle whose center of mass may lie between the focus of a collecting reflector and the reflector, and which will still be stably oriented toward the source of radiation by radiation pressure. I have also invented, as part of this invention, a design for a vehicle comprising a reflecting collector and an energy collector whose sink, or heat-rejecting, side may face away from the source of radiation, toward the colder part of space.

Thus the object of my invention is, generally, to teach how to make a space vehicle stably self-orienting by radiation pressure upon a reflective collector even though the center of mass of the vehicle lies between the reflective collector and the center of pressure which radiation upon such a reflector would produce; and by the application of the principles which permit me to accomplish this object, I am also enabled to teach the construction of a space vehicle in which a reflector is used both to stabilize the vehicle with respect to a source of radiant energy, and to collect such energy and concentrate it upon an energy converter which has its heat sink or dissipating side oriented away from the source of radiation. In the course of this teaching, I achieve other recognizably desirable ends whose importance will vary according to their application to specific problems.

For the better explanation and understanding of my invention, I have provided figures of drawing in which.

Figure 1:
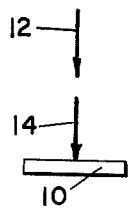
FIG. 1 represents an absorbing surface subjected to pressure from radiation normally incident upon it.

Referring to FIG. 1, there is represented an absorbing surface 10, upon which there falls radiation of energy density E, represented by arrow 12 as being normally incident upon 10. As has been explained hereinabove, such radiation will produce upon the surface of 10 a pressure P equal numerically to E, and in the same direction as E. This pressure P is represented by arrow 14.

Figure 2:
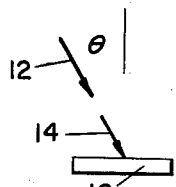
FIG. 2 represents an absorbing surface subjected to pressure from radiation incident upon it at an angle from the normal.

FIG. 2 represents the same absorbing surface 10, with radiation 12 of energy density E falling upon the surface but at an angle $\theta$ with the normal to the surface. In this case, the energy of density E flowing normally through a square centimeter of space is spread over an area of 10 greater than a square centimeter; specifically, it is spread over an area of 10 equal to 1 square centimeter divided by cos $\theta$. Thus, even though the radiation passing normally through a given square centimeter in space will produce upon the surface 10 a total force of E dynes, this force will be spread over a greater area of 10, so that the pressure P produced upon 10, represented by arrow 14, is now less numerically than E; it is equal to $E \cos \theta$, in the same direction as E.

Figure 3:
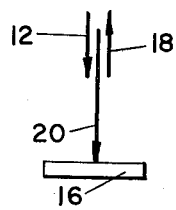
FIG. 3 represents a reflecting surface subjected to pressure from radiation normally incident upon it.
Figure 4:
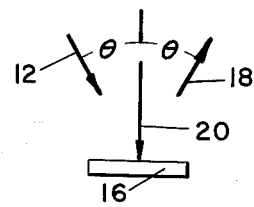
FIG. 4 represents a reflecting surface subjected to pressure from radiation incident upon it at an angle from the normal.

It may be noted that, 10 being a perfect absorber, there is no question of reaction upon 10 of energy reflected from it. That this happy simplification vanishes when energy falls upon a reflector may be seen by reference to FIG. 3, in which there is represented a reflecting surface 16, receiving normal radiation 12, represented by the arrow so numbered, of energy density E. Because 16 is assumed to be a perfect specular reflector, it will reflect back all the energy 12 as reflected energy 18, represented by the arrow so numbered. Since energy 18 is of the same density E as is 12, moving with the same speed c but with opposite velocity, there will be a reaction back upon 16 of the same magnitude and direction as that produced by the incidence of radiation 12. Thus the pressure P', represented by arrow 20, appearing upon 16 as a result of normal incidence and reflection of radiation of energy density E will be twice the magnitude of E, or of the quantity P; i.e., equal to 2E or 2P. It might appear that this double-magnitude pressure P' would follow the same simple law of variation with angle of incidence (relative to the normal to the surface of incidence) as does the pressure P upon an absorbing surface. Reference to FIG. 4 is here useful in explaining why this is not so. In FIG. 4, there are represented reflecting surface 16, incident energy 12, here incident at an angle $\theta$ with the normal to the surface 16, reflected energy 18, and an arrow 20 representing pressure P'. It is true, as it is for absorber 10 of FIG. 2, that a square centimeter, normally measured, of radiation 12 (and of reflected radiation 18) will be spread over an area of 16 equal to a square centimeter divided by cos $\theta$. That is, if one considers the energy E passing normally through one square centimeter and impinging upon surface 16, it is evident that it will impinge upon an area of 16 equal to one square centimeter divided by cos $\theta$. The total force from such impingement upon this area of 16 will be equal to E, and will have a component, parallel to 16, of $E \sin \theta$, and one, normal to 16, of $E \cos \theta$. This radiant energy will be reflected, as represented by 18, from surface 16 at an angle $\theta$, producing a reaction upon surface 16 having components $E \sin -\theta$, and $E \cos -\theta$, respectively. Since $E \sin \theta + E \sin -\theta = 0$, there will be no component of force parallel to the surface of 16; and since $E \cos \theta + E \cos -\theta = 2E \cos \theta$, the total force normal to the specified surface of 16 will be $2E \cos \theta$ spread over an area of one square centimeter divided by cos $\theta$; the pressure P' will be numerically equal to $2E \cos^2 \theta$, and will always be normal to the surface of the reflector 16, as arrow 20 indicates.

Figure 5:
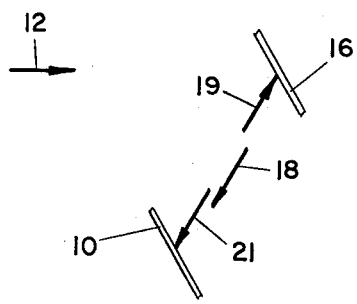
FIG. 5 represents radiation incident upon a reflecting surface and reflected thence to an absorbing surface.

For the practice of my invention, it is of interest to consider the net pressure produced when radiation 12 strikes a specular reflector 16 and the energy 18 reflected from it strikes an absorber 10 which is rigidly connected to 16. This situation is represented in FIG. 5. Here the reaction 19 upon reflector 16 from the reflection of energy 18 is equal in magnitude, collinear with, and opposite in direction to the force 21 produced by incidence of this reflected energy upon absorber 10; it should be noted that the pressures will generally not be the same unless the faces of 16 and 10 happen to be parallel to each other; but the surface integrals of the pressures, i.e., the total forces, will be equal in magnitude, and will cancel each other. If one considers that the reaction on 16 and the force on 10 all occur within a closed system which includes 10 and 16, it is not surprising that there is no net force or torque external to the system. However, since the reaction resulting from reflection of energy 18 is cancelled out, the net force on the system which includes 12 and 16 will be the same as though 16 were an absorber. Phrased in more general terms, if radiation falls upon a system which ultimately absorbs it, the net external force on the system will not depend upon internal events.

Figure 6:
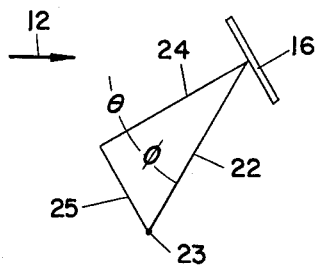
FIG. 6 represents radiation incident upon a reflecting surface free to rotate about a center of rotation.

This point is more important to stable orientation by radiation pressure than at first appears. FIG. 6 represents a reflecting surface 16 which is located a distance D, reference number 22, from a center of rotation 23. This center may be a point of suspension on a bearing, or may be simply the center of mass of a rigid system which moves freely under the local gravitational field (the so-called "weightless" condition). Radiation 12 strikes 16 at an angle $\theta$ with the normal 24 to the surface of 16; the angle between the same normal 24 and 22 is designated as $\phi$. As was previously explained, the net force upon 16 will be normal to the surface of 16, of magnitude $2EA \cos^2 \theta$, where A is the area of 16. Such force will produce a torque $2EA \cos^2 \theta D \sin \phi$, $D \sin \phi$ being the length of moment arm 25 about the center of rotation 23, the direction of the torque being such as to rotate the system clockwise. It may be shown by differentiating the torque with respect to $\theta$ that a slight displacement of the system in a counterclockwise direction will reduce the torque; but it is more satisfying to arrive at this conclusion by noting that the length of moment arm 25, $D \sin \phi$, will not vary with changes in $\theta$, while the force $2EA \cos^2 \theta$ will decrease rapidly for a slight increase in $\theta$. But such a decrease is incompatible with stability of the system, if 16 is regarded as one element of a light concentrating system, since all such elements must be oriented toward a central point, and, for stability of such a system, a motion which brings 16 closer to the source of radiation should produce an increase in the restoring torque, not a decrease.

Figure 7:
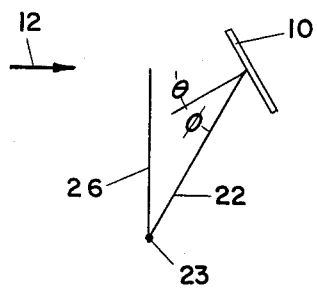
FIG. 7 represents radiation incident upon an absorbing surface free to rotate about a center of rotation.

FIG. 7 represents an absorber 10, replacing reflector 16 of FIG. 6; otherwise the elements in FIG. 7 are identical with those in FIG. 6. It should also be observed that the following description will apply equally well to an element 10 which is a virtual absorber in that radiation reflected from it strikes, ultimately, an absorber which is part of the same rigid system. Radiation 12 striking surface 10 at an angle $\theta$ with the normal to 10 will produce a pressure $E \cos \theta$ upon it, with a resulting force $EA \cos \theta$. This force will be in the same direction as 12, and will therefore have a moment arm 26 of length $D \sin (\theta+\phi)$, producing a torque in a clockwise direction of magnitude $EA \cos \theta D \sin (\theta+\phi)$. Differentiation with respect to will show mathematically that a slight counterclockwise displacement $\Delta\theta$ of the system of which 10 is a part will produce a torque change of $EAD \cos (2\theta+\phi)\Delta\theta$. For suitable values of $\phi$ and $\theta$, this may be positive. Considering the physical situation, a slight counterclockwise displacement of the system will increase the lever arm 26 around center 23, even though this same displacement will reduce the area of 10 projected normally to the direction of incident radiation 12; and, for suitable values of the angles, the increase in moment arm will more than compensate for the reduction of projected area.

It thus appears that a concentrating reflector may be made stably self-orienting toward a source of radiation if the reflector is made to assume the characteristics, so far as the external universe is concerned, of an absorber. I have shown how this may be done by directing the energy reflected from a specular reflector toward an absorber which is part of the same rigid system. It may be shown that it is not necessary that the radiation reflected from the externally irradiated reflector be reflected directly to an absorber; if a second reflector receives the reflected energy and reflects this a second time to an absorber, the second reflector, as has been shown, will function like an absorber of radiation incident on it; but this means that it appears to the first, externally irradiated reflector as an absorber. Therefore, the first reflector will itself behave, toward the external radiation, as if it were an absorber.

Since the formulas for the pressure of radiation upon a flat absorbing surface have been derived, it is possible to analyze any particular virtually absorbing surface by integrating the components of pressure over its surface and thus obtaining the total force on the surface produced by radiation pressure. It is also possible to choose some convenient moment center and integrate the moment contributions around the center to obtain the total moment, around the moment center, produced by radiation pressure on the surface. By dividing the total moment by the total force, it is possible to obtain an equivalent moment arm which is the distance from the chosen center to the center of pressure, at which the total force may be regarded as concentrated. (This technique is essentially similar to that used to calculate the location of the center of gravity of a weight distribution or to determine the center of hydraulic pressure on a given surface.) This I have done for several configurations of practical interest, which are represented in FIGS. 8, 9 and 10.

Figure 8:
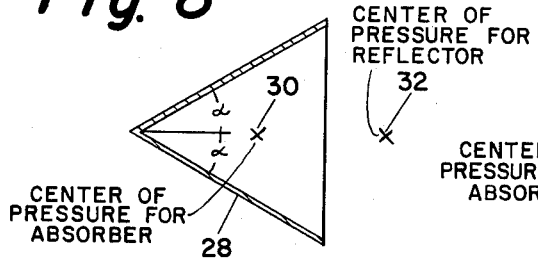
FIG. 8 represents in section a conical reflector and centers of pressure of radiation incident upon it.

FIG. 8 represents, in section, a simple cone, 28, which has a half-angle $\alpha$. As the analysis accomplished hereinabove with reference to FIGS. 1 through 7, inclusive, indicates, the center of pressure upon cone 28 produced by radiant energy entering its concave portion, generally from the right of the figure as drawn, will be located at different points, depending upon whether the surface of cone 28 is absorbing or reflecting out into space. If the inner surface of cone 28 is completely absorbing, the center of pressure upon it will be at the point represented at reference number 30. If the inner surface of 28 is reflecting, the center of pressure upon it will be located at the point represented by reference number 32. In terms of specific formulas, which may be derived by carrying out the procedure described hereinabove, point 30 will be located upon the central axis, or axis of symmetry of the cone, at a distance from the vertex or apex of the cone two-thirds of the distance from the vertex to the base of the cone, measured along the same axis (that is, two-thirds the altitude of the cone). The location of point 32 is somewhat more complex to express; using the altitude of the cone as the standard dimension, the distance along the axis from the vertex of the cone to point 32 is ⅔ $\tan \alpha$ cosecant $2\alpha \times$ cone altitude The product $\tan \alpha$ by the cone altitude is, of course, the radius of the cone at its base; if this radius be denoted by $b$, the preceding formula becomes ⅔$b$ cosecant $2\alpha$ The important teaching to be derived from FIG. 8 is that a radiation concentrating reflector tends to have a center of pressure located appreciably farther from itself than an absorbing surface of similar geometry, or a surface which has been rendered the equivalent of an absorber by having its reflected radiation received by an absorber, as was explained in detail with reference to FIG. 5.

Figure 9:
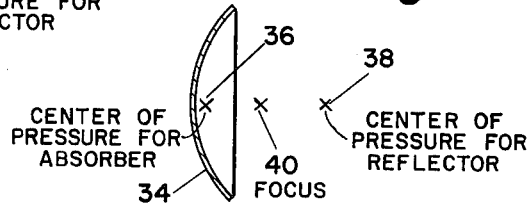
FIG. 9 represents in section a spheroidal reflector and centers of pressure of radiation incident upon it.
Figure 10:
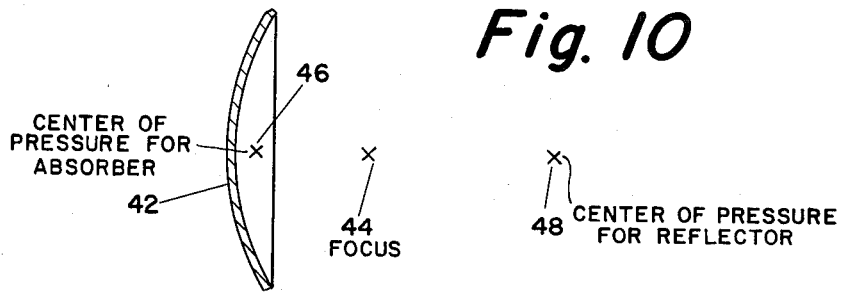
FIG. 10 represents in section a paraboloidal reflector and centers of pressure of radiation incident upon it.

FIG. 9 represents a spheroidal surface 34, whose center of pressure, for radiation incident upon it generally from the right of the figure, will be located at point 36, if the surface of 34 is absorbing, but will be located at 38, the center of curvature of the spheroid, if the surface of 34 is effectively reflecting. The focus of the spheroid will be located at point 40, half way between the center of curvature 38 and the apex of the surface 34. The formula for the location of point 36, in terms of its distance from the apex of the spheroid 34 (that is, the point where the axis of symmetry intersects the surface of the spheroid), is most conveniently expressed by letting R represent the radius of curvature of the spheroid and A represent the altitude of the spheroid (that is, the distance from the apex of the spheroid to its base). Using these symbols, the distance from the apex of the spheroid 34 to point 36 is $$A \times (R-2/3A)+(2R-A)$$

In this instance we have the interesting result that the center of pressure of the reflecting spheroid lies farther from its apex than does the focus of the reflecting spheroid.

FIG. 10 represents a paraboloidal surface 42 whose focus is located at 44. If the surface 42 is effectively absorbing, the center of pressure produced upon it by radiation entering generally from the right of the figure will be located at 46. If the surface 42 is effectively reflecting, the center of pressure will be located at point 48. Using $f$ to represent the focal length of the paraboloid, and $b$ to represent the radius of the paraboloid at its base, the distance from the apex of surface 42 to point 46 will be $$b^2/8f$$

The distance from the apex of surface 42 to point 48 will be given by the much more complex formula $$f+\frac{b^2/8f}{1-(2f/b)^2 \ln [1+(b/2f)^2]}$$

Without analyzing this function in detail, it may be stated that it causes the center of pressure 48 to appear farther from the collector surface than the principal focus 44. Center of pressure 46, for an effectively absorbing collector, for any $b^2$ less than $8f^2$, will lie closer to the surface 42 than does the focus 44.

Figure 11:
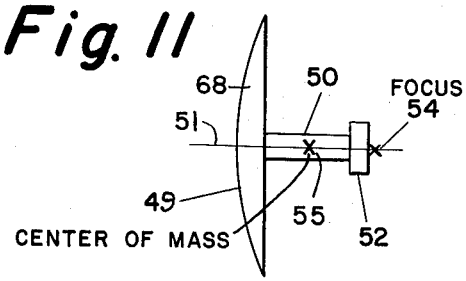
FIG. 11 represents an embodiment of my invention in a space vehicle.

From the discussion of FIGS. 8, 9 and 10, it is evident that the center of pressure upon a concave surface will lie close to the surface if the surface is effectively absorbing. In the examples given, it lies within the solid or volume defined by the surface. This may be accomplished by providing an absorbing surface to receive the radiation collected by the concave surface if it is reflecting, the absorbing surface being made sufficiently large to receive and absorb substantially all of the reflected energy. If this condition is observed, it is possible to provide a space vehicle relatively short axially in comparison to the diameter of its collecting surface, and yet capable of self-orientation toward a source of radiation. Such a vehicle is represented in FIG. 11, in which 49 represents a paraboloidal or other suitable radiation collector having its inner surface reflective, its central portion being connected to a central column 50 coaxial with the central axis 51 of collector 49 carrying energy-using equipment, an absorbing energy converter 52 being located at the end of column 50 in the vicinity of focus 54 of the paraboloid. The center of radiation pressure upon collector will, by FIG. 10, be located within the volume surrounded by collector 49 because the radiation collected by 49 will be concentrated upon absorbing energy converter 52, causing collector 49 to be effectively absorbing, so far as the external universe is concerned. So long as the center of mass of the vehicle is located farther from the apex of collector 49 than the center of pressure, the vehicle will tend to orient itself stably to collect radiation from an external radiant energy source. The form of the vehicle as represented is clearly such as to make it easy to locate the center of mass 55 somewhere in column 50, presumably approximately midway between 49 and 54, outside of the volume 68 defined by 49. However, this vehicle has the possible disadvantage that the back, or non-absorbing (or heat-dissipating) surface of energy converter 52 is turned toward the source of radiation. This may be undesirable.

Figure 12:
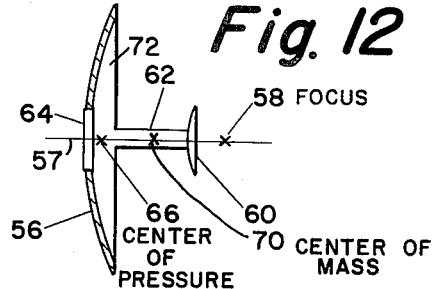
FIG. 12 represents another embodiment of my invention in a space vehicle.

FIG. 12 represents an alternate embodiment of my invention, in which 56 (represented in section to show certain interior features of the vehicle) is a collector paraboloidal in shape, having a central axis 57 and having its principal focus at 58. Confocal and coaxial with 56 there is provided a paraboloid 60 having an actually reflecting convex surface. Columnar housing 62 contains the major portion of the vehicle's payload, including energy-using equipment, and serves to maintain reflectors 56 and 60 confocal and coaxial as specified. An absorbing energy converter 64 is located, as represented, at what would be the apex of paraboloid 56. The radiant energy collected by reflector 56 is focussed by it upon paraboloidal reflector 60, which, in turn, directs it to the absorbing surface of absorbing energy converter 64. It may be observed that the reverse of converter 64 is directed toward the back of reflector 56; if the vehicle is oriented to collect energy from an energy source, the reverse of converter 64 will be directed into space away from the energy source. By the formulas adduced in connection with the discussion of FIG. 10, the center of pressure of radiation will be located at point 66; for the energy collected by reflector 56 is ultimately directed toward an absorbing surface, that of absorbing energy converter 64. As was observed in the discussion of FIG. 11, the structure of the vehicle represented in FIG. 12 is such that the center of mass 70 of the vehicle can easily be located somewhere in column 62, more remote from converter 64 than is the center of pressure 66 and outside the volume 72 defined by reflector 56. This vehicle, too, will tend to orient itself with the concave portion of its collector turned toward the radiation source; but in this case, unlike the embodiment of FIG. 11, the reverse side of the energy converter 64 will be turned away from the radiation source, toward the colder part of space.

It may be seen that the use of my invention permits the use of concave radiation collectors, actually reflecting but rendered effectively absorbing, in self-orienting structures whose centers of mass may be located closer to the collector than its own focus. Such structures will, of course, be appreciably more compact than those of the prior art.

As I have devoted appreciable of my description and explanation herein to teaching the principles embodied in the representations of FIGS. 11 and 12, it will be readily appreciated that these principles may readily be applied to a plurality of embodiments of my invention, varying according to special requirements.

What is claimed is:
1. A space vehicle assembly self-orienting by radiation pressure with respect to a source of radiation and having a center of mass, comprising, in combination:
a concave surface, reflecting for radiant energy, having a focus, a central axis, and defining a volume;
a converter for such radiant energy, having a surface absorbing for said radiant energy;
means for rigidly connecting the said concave surface and the said converter in such orientation that substantially all radiant energy incident from outside the said assembly, parallel to the said central axis, upon the said concave surface and reflected from the said concave surface will fall upon the said absorbing surface of the said converter;
the center of mass of the said assembly lying on the said central axis, outside of the volume defined by the said concave surface, but closer to the said concave surface than the focus of the said concave surface.

2. A space vehicle assembly self-orienting by radiation pressure with respect to a source of radiation and having a center of mass, comprising, in combination:
a first paraboloidal surface, reflecting on its concave side for radiant energy, having a first focal length and having an aperture at its apex, and defining a volume;
a second paraboloidal surface, reflecting on its convex side for said radiant energy, having a central axis, and having a second focal length less than the said first focal length;
means for rigidly mounting the said second and first paraboloidal surfaces confocally and coaxially; and
a converter for said radiant energy, having an obverse surface absorbing for the said radiant energy, located on the common axis of the said paraboloidal surfaces, the said obverse surface facing the said second paraboloidal surface, the reverse of the said converter being aligned with the said aperture in the said first paraboloidal surface;
the center of mass of the said assembly being located between the said first and the said second paraboloidal surfaces, on the said common axis, and outside the volume defined by the said first paraboloidal surface.

References Cited by the Examiner
UNITED STATES PATENTS

| | | | |
|---|---|---|---|
| 2,623,183 | 12/1952 | Buck | 250—83.3 |
| 2,966,823 | 1/1961 | Trimble | 250—203 X |
| 2,985,783 | 5/1961 | Garbuny et al. | 250—83.3 |
| 3,020,406 | 2/1962 | Whitney | 250—83.3 |
| 3,061,727 | 10/1962 | Roth et al. | 250—83.3 |
| 3,064,534 | 11/1962 | Tumavicus | 343—100 |
| 3,088,034 | 4/1963 | Jones et al. | 250—203 |
| 3,152,260 | 10/1964 | Cummings | 244—1 |
| 3,173,626 | 3/1965 | Sohn | 244—1 |

OTHER REFERENCES

American Rocket Society Journal: "Attitude Stabilization by Means of Solar Radiation Pressure," May 1959, pp. 371–373.

American Rocket Society Journal: "Stabilization and Attitude Control of Satellite Vehicles," December 1959, pp. 927–931.

D. H. Dickstein: "A Solar Probe," preprint 61–179–1873 of the American Rocket Society Meeting of 13–16 June 1961.

RALPH G. NILSON, *Primary Examiner.*

A. R. BORCHELT, *Examiner.*

E. STRICKLAND, M. A. LEAVITT,
*Assistant Examiners.*